United States Patent [19]
Morimoto et al.

[11] Patent Number: 5,009,129
[45] Date of Patent: Apr. 23, 1991

[54] TRANSMISSION RATIO CONTROL SYSTEM FOR A CONTINUOUSLY VARIABLE TRANSMISSION

[75] Inventors: Yoshihiko Morimoto, Mitaka; Tetsushi Kohno, Musashino, both of Japan

[73] Assignee: Fuji Jukogyo Kabushiki Kaisha, Tokyo, Japan

[21] Appl. No.: 418,187

[22] Filed: Oct. 6, 1989

[30] Foreign Application Priority Data

Oct. 14, 1988 [JP] Japan .................. 63-260183
Oct. 14, 1988 [JP] Japan .................. 63-260184

[51] Int. Cl.⁵ .................................. B60K 41/14
[52] U.S. Cl. ........................... 74/866; 364/424.1; 474/18; 74/867
[58] Field of Search ............ 74/866, 867; 474/12, 474/18, 28; 364/424.1

[56] References Cited

U.S. PATENT DOCUMENTS

| | | | |
|---|---|---|---|
| 4,782,934 | 11/1988 | Takano et al. | 74/866 X |
| 4,784,021 | 11/1988 | Morimoto | 74/868 |
| 4,794,819 | 1/1989 | Tanaka et al. | 74/866 |
| 4,827,803 | 5/1989 | Miyawaki | 74/866 |
| 4,843,913 | 7/1989 | Miyawaki | 74/866 X |
| 4,850,935 | 7/1989 | Morimoto | 474/18 |
| 4,909,103 | 3/1990 | Morimoto | 74/867 X |

FOREIGN PATENT DOCUMENTS 258004  3/1988  European Pat. Off. ............ 74/866
59-208253  11/1984  Japan .

Primary Examiner—Allan D. Herrmann
Assistant Examiner—Benjamin Levi
Attorney, Agent, or Firm—Martin A. Farber

[57] ABSTRACT

A control system for a continuously variable transmission for a motor vehicle has a transmission ratio control valve for controlling the transmission ratio. The transmission ratio is controlled in accordance with a transmission ratio changing rate. At acceleration during low vehicle speed driving, the transmission ratio changing rate is set to a large value so as to quickly increase the transmission ratio.

4 Claims, 7 Drawing Sheets

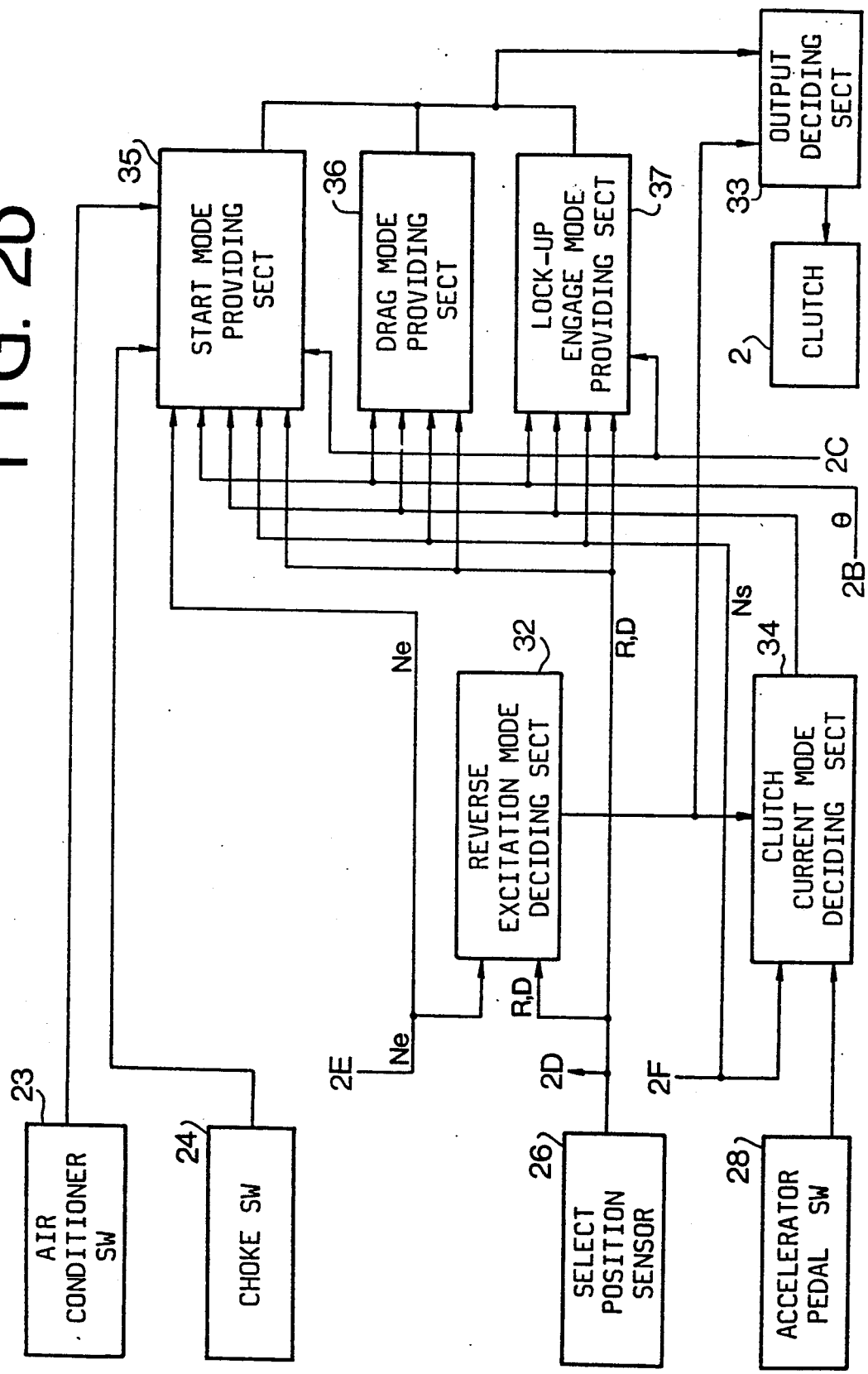

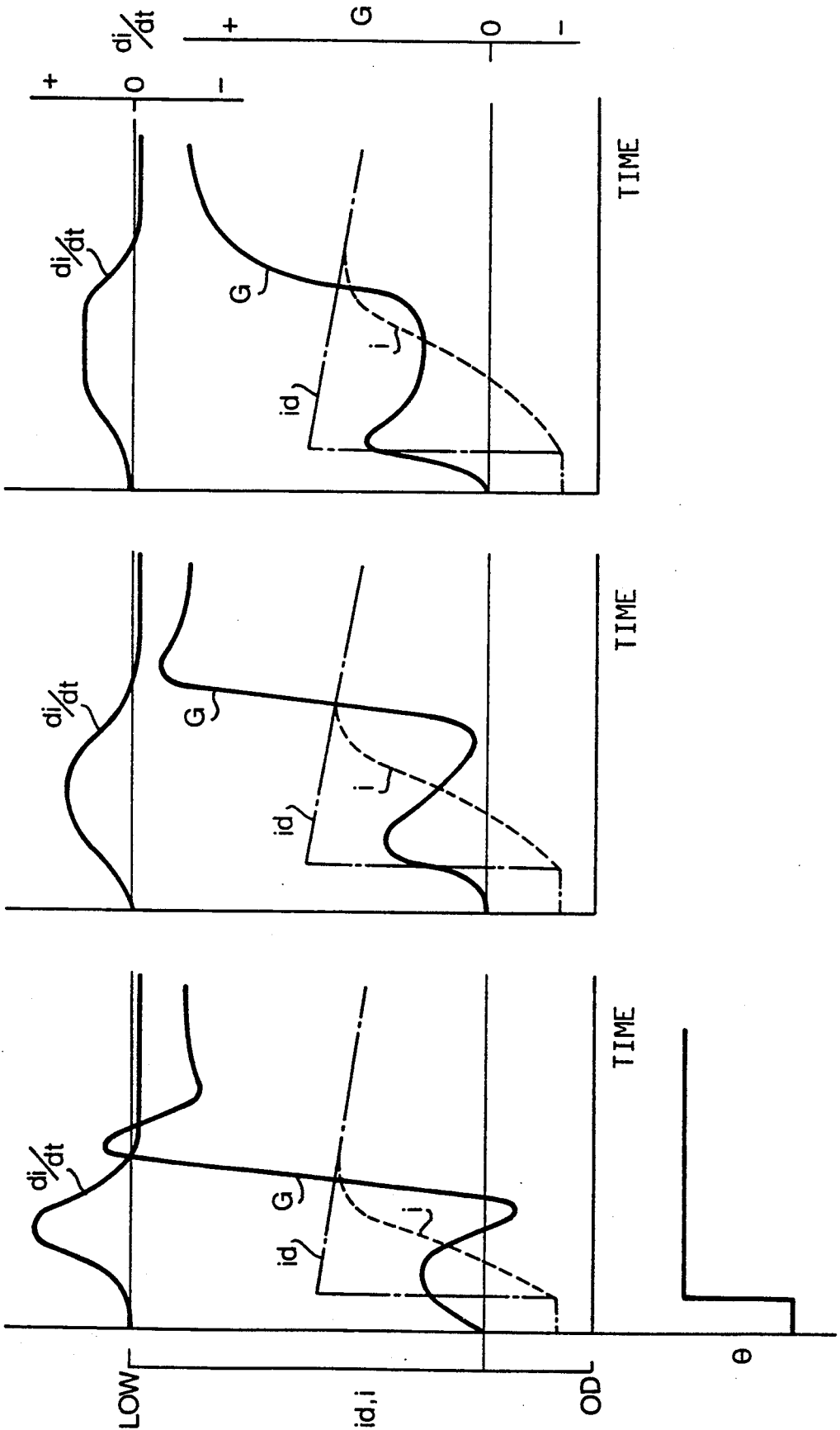

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission (CVT) for a motor vehicle, and more particularly to a system for controlling the transmission ratio changing speed rate in accordance with the transmission ratio and the engine speed.

In such a system, in order to prevent overshooting or hunting at a transient state, the convergence of the transmission ratio must be improved as well as the response of the system. A transmission ratio changing speed control system has been heretofore proposed, in which the changing speed rate of the transmission ratio is controlled in accordance with the difference between the actual transmission ratio and a desired transmission ratio. The desired transmission ratio is corrected to obtain an optimum value in every driving condition, thereby improving the feeling of acceleration.

As shown in FIG. 5a, at acceleration of a vehicle, the desired transmission ratio id is quickly increased in accordance with the depression of the accelerator pedal of the vehicle. Thereafter, as the vehicle speed increases, the desired transmission ratio id gradually reduces. The transmission ratio changing speed rate is determined to control the actual transmission ratio i it converges toward the desired transmission ratio id. At that time, acceleration G of the vehicle occurs as shown in FIG. 5c, which remarkably affects the feeling of acceleration. That is, at acceleration, a driver feels a maximum acceleration Gm, a time t to reach the maximum acceleration Gm from a time of starting of the acceleration, and the difference between the feeling of acceleration and the driver's requirement.

In low speed driving, a large maximum acceleration Gm which quickly increases within a short time is preferable to satisfy the driver's desire for a large acceleration.

In high speed the driving, drive pulley speed Np and driven pulley speed Ns (vehicle speed) of the CVT become high even if the actual transmission ratio i is the same as that at low speed driving. Accordingly, an increment $\Delta$ Np of the drive pulley speed becomes large with respect to the same transmission ratio changing speed rate di/dt as the low speed driving. If the transmission ratio is quickly increased to a large value, engine speed quickly increases, which gives an unpleasant feeling like engine racing to the driver. Accordingly, it is preferable to keep the increment $\Delta$ Np of the drive pulley speed Np constant regardless of the magnitude of the acceleration and the vehicle speed.

Japanese Patent Application Laid-open 59-208253 discloses a system for controlling the transmission ratio at kickdown. The transmission ratio changing speed rate changes gently at an early stage of acceleration in low speed driving or at low load of the engine, and increases quickly after a predetermined time. However, since the transmission ratio changing speed rate is reduced at the early period of acceleration, the transmission does not produce sufficient driving torque. Therefore, the system does not meet the requirement for rapid acceleration as obtained at kickdown.

SUMMARY OF THE INVENTION

The object of the present invention is to provide a control system which improves acceleration characteristic in a wide range of vehicle speed.

According to the present invention, there is provided a control system for a continuously variable transmission for transmitting the power of an engine mounted on a motor vehicle, the engine having a throttle valve, the transmission comprising a drive pulley having a hydraulically shiftable disc and a hydraulic cylinder for operating the disc, a driven pulley having a hydraulically shiftable disc and a hydraulic cylinder for operating the disc of the driven pulley, a belt engaged with both pulleys, the control system comprising a a first hydraulic circuit having a pump for supplying oil to both hydraulic cylinders, a transmission ratio control valve for controlling the oil supplied to the cylinder of the drive pulley to change the transmission ratio to a desired transmission ratio.

The system comprises transmission ratio control means for operating the transmission ratio control valve a drive pulley speed sensor for producing a drive pulley speed signal, a driven pulley speed sensor for producing a driven pulley speed signal, a throttle position sensor for sensing opening degree of the throttle valve and for producing a throttle opening degree signal, first calculator means responsive to the drive pulley speed signal and the driven pulley speed signal for producing an actual transmission ratio signal, means responsive to the throttle opening degree signal and to the actual transmission ratio signal for producing a desired transmission ratio signal, second calculator means responsive to the desired transmission ratio signal and to the actual transmission ratio signal for producing a transmission ratio changing speed signal, third calculator means responsive to the throttle opening degree signal for producing a throttle opening degree changing speed signal, coefficient setting means responsive to the driven pulley speed signal as a vehicle speed signal and to the throttle opening degree signal for producing a correcting coefficient, correcting means for correcting the transmission ratio changing speed signal with the correcting coefficient so as to provide a higher transmission ratio changing speed (rate) in a low vehicle speed range, and driving means responsive to the corrected transmission ratio changing speed signal for operating the transmission ratio control means, for controlling the transmission ratio.

In an aspect of the invention, the correcting coefficient is an increasing function of the throttle opening degree changing speed signal and a decreasing function of the driven pulley speed signal in a low vehicle speed range.

The other objects and features of this invention will become understood from the following description with reference to the accompanying drawings.

BRIEF DESCRIPTION OF DRAWINGS

FIGS. 2a and 2b show a block diagram of a control unit according to the present invention;

FIGS. 4a to 4c are graphs showing characteristics of acceleration corresponding to different transmission ratio changing speeds in a low speed (rate) driving range;

DETAILED DESCRIPTION OF THE PREFERRED EMBODIMENTS

Figure 1:
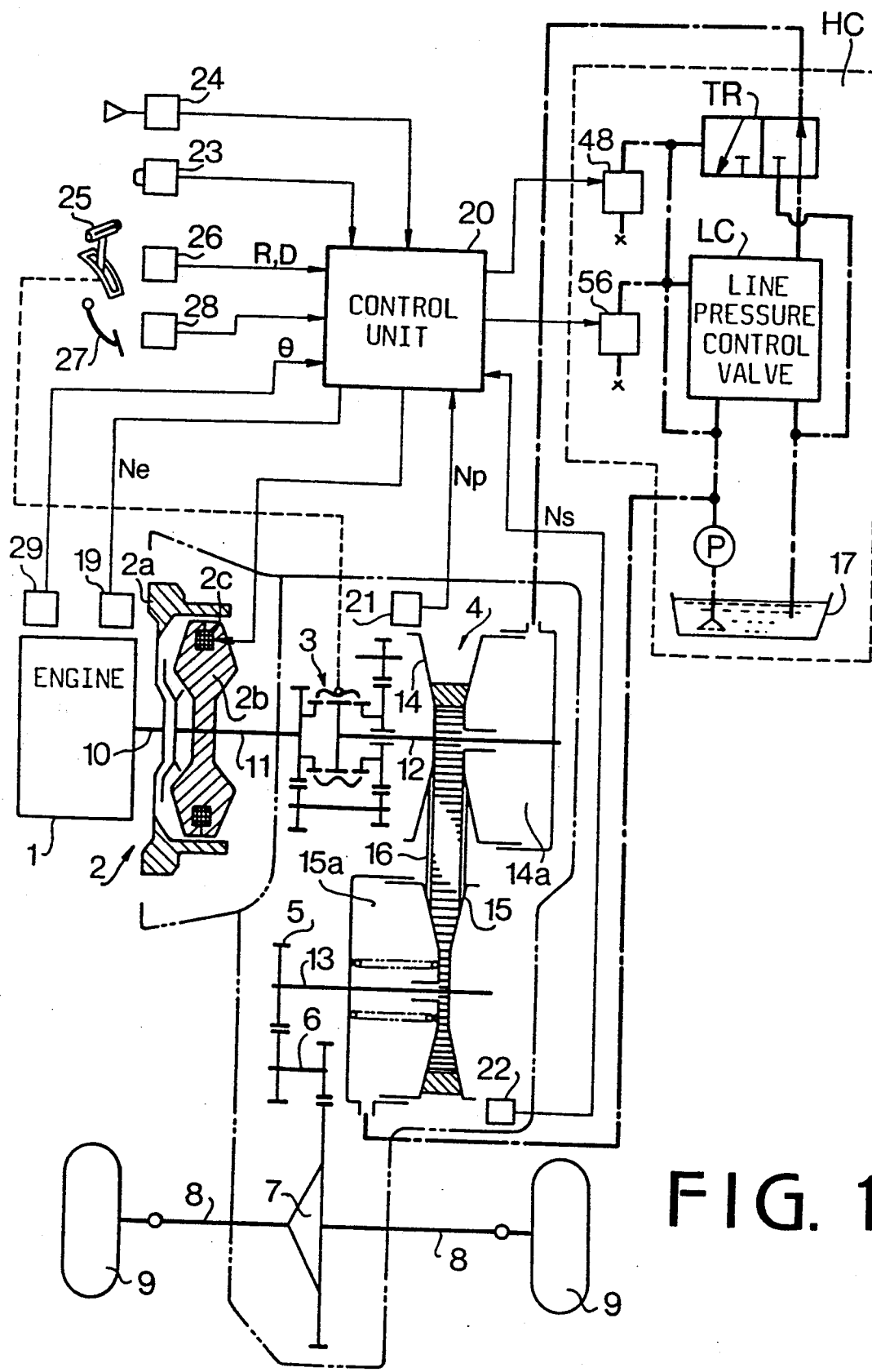
FIG. 1 is a schematic illustration of a continuously variable belt-drive transmission to which the present invention is applied.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to a crankshaft 10 of the engine 1, a driven member 2b secured to an input shaft 11 of the transmission 4, and a magnetizing coil 2c provided in the driven member 2b. Magnetic powder material is provided in a gap between the drive member 2a and driven member 2b. When the magnetizing coil 2c is excited by the clutch current, the driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive transmission 4, the selector mechanism 3 is provided between the input shaft 11 and a main shaft 12. The selector mechanism 3 is provided with a synchromesh mechanism comprising gears, hub, and sleeve for connecting the input shaft 11 and the main shaft 12 to selectively provide a driving position (D) and a reverse driving position (R).

The continuously variable belt-drive automatic transmission 4 has the main shaft 12 and the output shaft 13 provided in parallel with the main shaft 12. A drive pulley 14 provided with a hydraulic cylinder 14a is mounted on the main shaft 12. A driven pulley 15 provided with a hydraulic cylinder 15a is mounted on the output shaft 13. A drive belt 16 engages with the drive pulley 14 and the driven pulley 15. The hydraulic cylinders 14a and 15a are communicated with an oil hydraulic control circuit HC. The cylinder 14a is supplied with pressurized oil by an oil pump P from an oil reservoir 17 passing through a line pressure control valve LC and a transmission ratio control valve TR. The cylinder 15a is applied with pressurized oil from the pump P. The hydraulic control circuit is responsive to vehicle speed, engine speed and throttle valve position for controlling the amount of oil supplied to the cylinders 14a and 15a. The pulleys 14 and 15 are operated by compressive forces of the cylinders so that the running diameter of belt 16 varies to infinitely change the transmission ratio.

An electronic control system for the clutch 2 and the belt-drive transmission 4 has an engine speed sensor 19, and rotating speed sensors 21 and 22 for respectively sensing rotating speeds of the drive pulley 14 and the driven pulley 15. A choke switch 24 produces an output signal when a choke valve of the engine 1 is closed, and an air conditioner switch 23 produces an output signal at the operation of an air conditioner. A selector lever 25 connected to the selector mechanism 3 is provided with a select position sensor 26 for sensing the driving positions (D), (Ds), the neutral position (N) and the reverse position (R). An accelerator pedal switch 28 is provided for sensing the depression of an accelerator pedal 27, and a throttle position sensor 29 is provided.

Output signals of the sensors and pulses of the switches are applied to an electronic control unit 20 which produces a clutch current control signal for the clutch 2 and a control signal for controlling the transmission ratio (i) and a line pressure control signal for the control circuit HC.

Figure 2A:
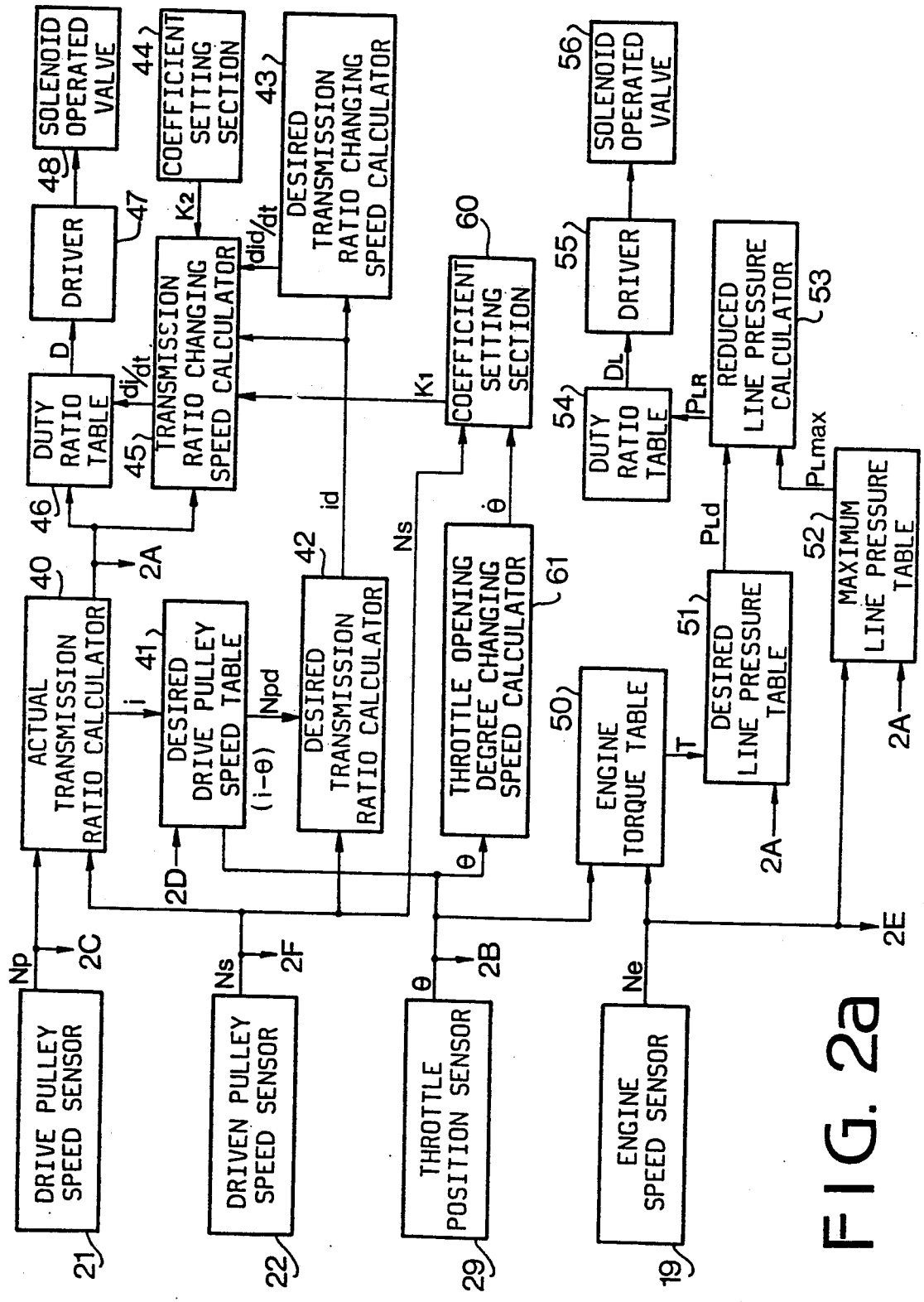

Referring to FIGS. 2a and 2b showing the control unit 20 of FIG. 1, a reverse excitation mode deciding section 32 is applied with an engine speed signal Ne of the sensor 19 and a drive position signal of the select position sensor 26. When the engine speed Ne is below 300 rpm, or the selector lever 25 is at a neutral position (N) or a parking position (P), the reverse excitation mode deciding section 32 produces a reverse excitation signal which is applied to an output deciding section 33, so that a small reverse current flows in the clutch 2 to release the clutch completely.

A clutch current mode deciding section 34 is applied with signals from the reverse excitation mode deciding section 32 and accelerator pedal switch 28, and vehicle speed signal V from the driven pulley speed sensor 22 for deciding driving conditions such as a starting mode to produce output signals. The output signals are applied to a start mode providing section 35, drag mode providing section 36, and clutch lock-up engage mode providing section 37.

The start mode providing section 35 decides clutch current of a starting characteristic dependent on the engine speed Ne at ordinary start or at closing of the choke switch 24 or of the air conditioner switch 23. The starting characteristic is corrected by signals from the throttle valve opening degree $\theta$, vehicle speed V, and driving positions (D), (Ds) and reverse position (R).

The drag mode providing section 36 decides a small drag current when the accelerator pedal 27 is released at a low speed in the driving position and the reverse position for providing a drag torque to the clutch 2 for the reduction of clearances formed in the transmission and for the smooth starting of the vehicle.

The clutch lock-up engage mode providing section 37 decides a lock-up current in response to the vehicle speed V and throttle opening degree $\theta$ at the driving position and reverse position for entirely engaging the clutch 2. Outputs of the sections 35, 36 and 37 are applied to the output deciding section 33 to control the clutch current.

A system for controlling the transmission ratio and the line pressure will now be described. Output signals $N_P$ and $N_S$ of the sensors 21, 22 are fed to an actual transmission ratio calculator 40 to produce an actual transmission ratio i in accordance with $i = N_P/N_S$. The actual transmission ratio i and output signal $\theta$ of the throttle position sensor 29 are fed to a desired drive pulley speed table 41 to derive a desired drive pulley speed Npd in accordance with values of the ratio i and signal $\theta$. The desired drive pulley speed Npd and the driven pulley speed Ns are fed to a desired transmission ratio calculator 42 to calculate a desired transmission ratio id in accordance with the desired drive pulley speed Npd and driven pulley speed Ns which corresponds to vehicle speed.

The desired transmission ratio id is fed to a desired transmission ratio changing speed calculator 43 which produces a desired transmission ratio changing speed (rate) did/dt. The speed (rate) did/dt is the amount of change of the desired transmission ratio id during a predetermined time interval. Coefficient setting sections 44 and 60 are provided for producing coefficients K2 and K1 respectively. The actual transmission ratio i, desired transmission ratio id, desired transmission ratio changing speed (rate) did/dt and coefficients K1 and K2 are applied to a transmission ratio changing speed calculator 45 to produce a transmission ratio changing speed (rate) di/dt from the following formula.

$$di/dt = K1(id-i) + K2 \, did/dt$$

In the formula, the term of $(id-i)$ is a control quantity dependent on the difference between the desired and actual transmission ratios and did/dt is a term for compensating a phase lag in the system.

The speed (rate) di/dt and actual ratio i are applied to a duty ratio table 46 to derive a duty ratio D in accordance with $D = f(di/dt, i)$ using a table at decreasing and increasing of the transmission ratio. The duty ratio D is supplied to a solenoid operated on-off valve 48 provided in the hydraulic circuit 17 through a driver 47.

On the other hand, the engine speed Ne from the engine speed sensor 19 and the throttle opening degree $\theta$ from the throttle position sensor 29 are applied to an engine torque table 50 to derive an engine torque T. The engine torque T and the actual transmission ratio i from the calculator 40 are applied to a desired line pressure table 51 to derive a desired line pressure $P_{Ld}$.

In a hydraulic circuit of the control system, oil pressure discharged from an oil pump varies in accordance with the change of the engine speed Ne, so that a maximum line pressure $P_{Lmax}$ also varies. In order to detect the variance of the maximum line pressure $P_{Lmax}$, the control unit is provided with a maximum line pressure table 52 to which the engine speed Ne and the actual transmission ratio i are supplied. Therefore, the maximum line pressure $P_{Lmax}$ is obtained.

The desired line pressure $P_{Ld}$ and the maximum line pressure $P_{Lmax}$ are applied to a reduced line pressure calculator 53 wherein a reduced line pressure $P_{LR}$ is calculated based on the proportion of the desired line pressure $P_{Ld}$ to the maximum line pressure $P_{Lmax}$. The reduced line pressure $P_{LR}$ is applied to a duty ratio table 54 to derive a duty ratio $D_L$ corresponding to the reduced line pressure $P_{LR}$. The duty ratio $D_L$ is supplied to driver 55 which operates a solenoid operated on-off valve 56 provided in the hydraulic circuit 17 at the duty ratio.

A correcting system for acceleration in low speed driving will be described hereinafter.

The transmission ratio changing speed (rate) di/dt is mainly determined by the control quantity (id-i) and the coefficient K1 in the above described equation. The control quantity (id-i) is determined in accordance with the desired transmission ratio id and the actual transmission ratio i at acceleration. Therefore, in order to correct the transmission ratio changing speed (rate) di/dt in low speed driving for improving the feeling of acceleration, the value of the coefficient K1 must be properly set. Thus, the coefficient K1 is regarded as a correcting coefficient during acceleration.

The acceleration can be expressed by changing speed (rate) $\dot{\theta}$ of the throttle valve opening degree $\theta$. If the throttle opening changing speed (rate) $\dot{\theta}$ is high, it is regarded that a large acceleration is required, and the correcting coefficient K1 is therefore set to a large value. Further, the acceleration requirement becomes strong with reduction of vehicle speed. Thus, the correcting coefficient K1 is set to a large value during low speed driving.

Figure 3:
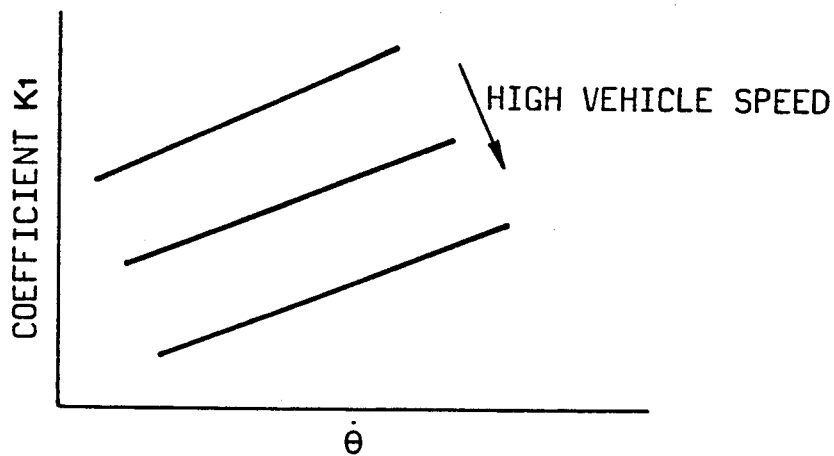
FIG. 3 is a graph showing a look-up table of a correcting coefficient for a low vehicle speed range.
Figure 5A:
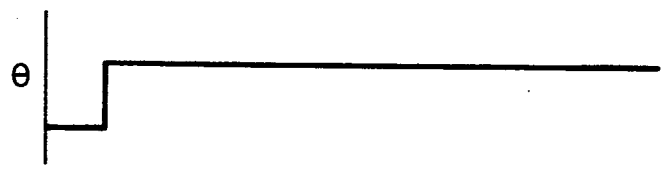
FIGS. 5a to 5c are graphs for explaining the acceleration feeling.
Figure 5B:
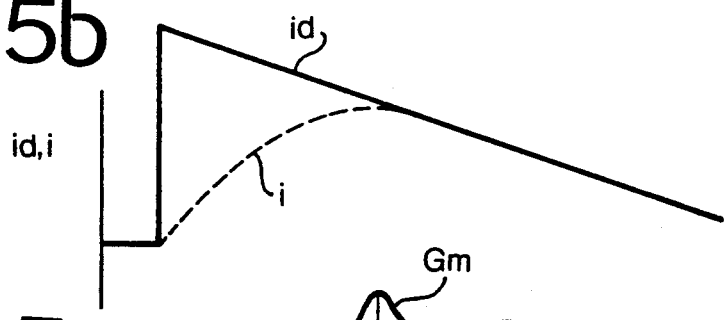
Figure 5C:
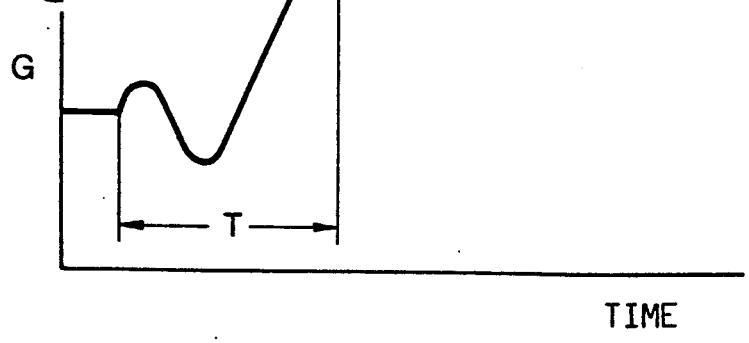

In accordance with the above described principle, the control system is provided with a throttle opening degree changing speed calculator 61 to which the throttle opening degree $\theta$ from the throttle position sensor 29 is applied for calculating a throttle opening degree changing speed (rate) $\dot{\theta}$. The throttle opening changing speed (rate) $\dot{\theta}$ and the driven pulley speed Ns as vehicle speed are applied to a coefficient setting section 60. The section 60 derives the coefficient K1 from the look-up table shown in FIG. 3. As shown in FIG. 3, the coefficient K1 is an increasing function of the throttle opening degree changing speed (rate) $\dot{\theta}$ and a decreasing function of the vehicle speed.

In operation, while the vehicle is at a stop, the cylinder 15a of the driven pulley 15 is supplied with the line pressure, and the cylinder 14a of the drive pulley 14 is drained. Thus, in the pulley and belt device of the continuously variable belt-drive transmission, the drive belt 16 engages with the driven pulley 15 at a maximum running diameter to provide the largest transmission ratio (low speed stage).

When the accelerator pedal is depressed, the clutch current increases progressively with increasing engine speed. The electromagnetic clutch 2 is gradually engaged, transmitting the engine power to the drive pulley 14. The power of the engine is transmitted to the output shaft 13 at the largest transmission ratio by the drive belt 16 and driven pulley 15, and further transmitted to axles of the driving wheels 9. Thus, the vehicle is started.

In a low speed range where the actual transmission ratio i is large, if the engine torque T is large, the desired line pressure is set to a large value. A corresponding duty signal is applied to the solenoid operated on-off valve 56 which produces a control pressure for increasing the line pressure. In a high speed range where the actual transmission ratio i is small, the engine torque T becomes small, and the line pressure is reduced accordingly.

The line pressure is applied to the cylinder 15a of the driven pulley 15. The cylinder 14a of the drive pulley 14 is drained.

Output signals $N_P$, $N_S$ and $\theta$ of sensors 21, 22 and 29 are read. The actual transmission ratio calculator 40 produces an actual transmission ratio i. The desired drive pulley speed Npd is derived from the desired drive pulley speed table 41 is accordance with values of the ratio i and signal $\theta$. The desired transmission ratio calculator 42 calculates a desired transmission ratio id in accordance with the speeds Npd and the driven pulley speed Ns which corresponds to vehicle speed V.

The actual transmission ratio i, desired transmission ratio id, desired transmission ratio changing speed (rate) did/dt calculated at the transmission ratio changing speed calculator 43 and coefficients K1 and K2 are applied to the transmission ratio changing sped calculator 45 to produce a transmission ratio changing speed (rate) di/dt.

The duty ratio D is derived from the duty ratio table 46 in accordance with $D = f(di/dt, i)$. The duty ratio D is supplied to a solenoid operated on-off valve 48 to produce a control pressure in the form of a pulse train for shifting a spool of the transmission ratio control valve between oil supply and drain positions.

When the duty ratio D is reduced, the off period of the solenoid operated on-off valve 48 becomes long, so that a spool of the transmission ratio control valve is positioned in the drain position for a longer time for draining the cylinder 14a. Thus, the transmission ratio becomes large. When the duty ratio D becomes large, the transmission ratio control valve stays at the oil supply position for a longer time, so that oil is supplied to the cylinder 14a to lower the transmission ratio.

Describing the operation at acceleration, when the accelerator pedal is greatly depressed, the desired transmission ratio id is set to a low change speed value (large transmission ratio) as shown in FIGS. 4a to 4c. The actual transmission ratio i is increased in response to the desired transmission ratio id. The throttle opening degree changing speed (rate) $\dot{\theta}$ is calculated at the calculator 61 and the correcting coefficient K1 is determined in response to the throttle opening degree changing speed (rate) $\dot{\theta}$ and the vehicle speed V at the section 60.

If the throttle opening degree changing speed (rate) $\dot{\theta}$ is large at low vehicle speed V, the correcting coefficient K1 is set to a large value, so that the transmission ratio changing speed (rate) di/dt becomes large as shown in FIG. 4a. The acceleration G once becomes negative at increasing transmission ratio thereafter the acceleration G rapidly increases to provide the maximum acceleration Gm so as to meet the acceleration requirement of the driver. When the vehicle speed increases or the throttle opening degree changing speed (rate) $\theta$ reduces, which means reduction of the acceleration requirement, the coefficient K1 reduces, thereby reducing the transmission changing speed (rate) di/dt. The acceleration G varies as shown in FIG. 4b.

When the acceleration requirement is further reduced, the acceleration G smoothly varies as shown in FIG. 4c.

Figure 6:
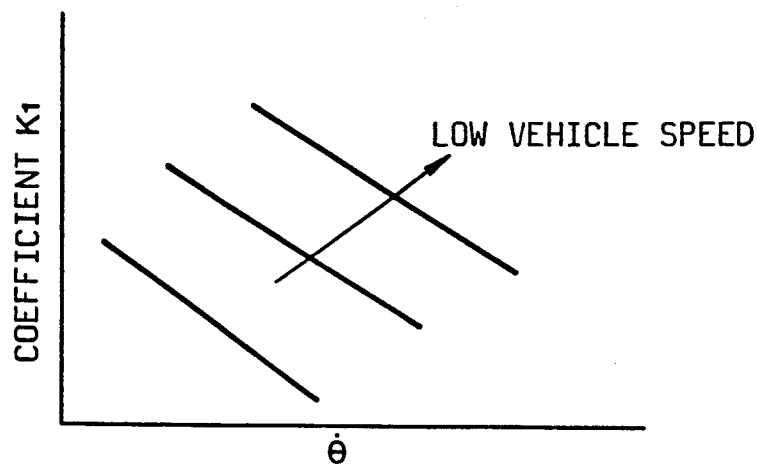
FIG. 6 is a graph showing a look-up table of a second embodiment for a high vehicle speed range.
Figure 7:
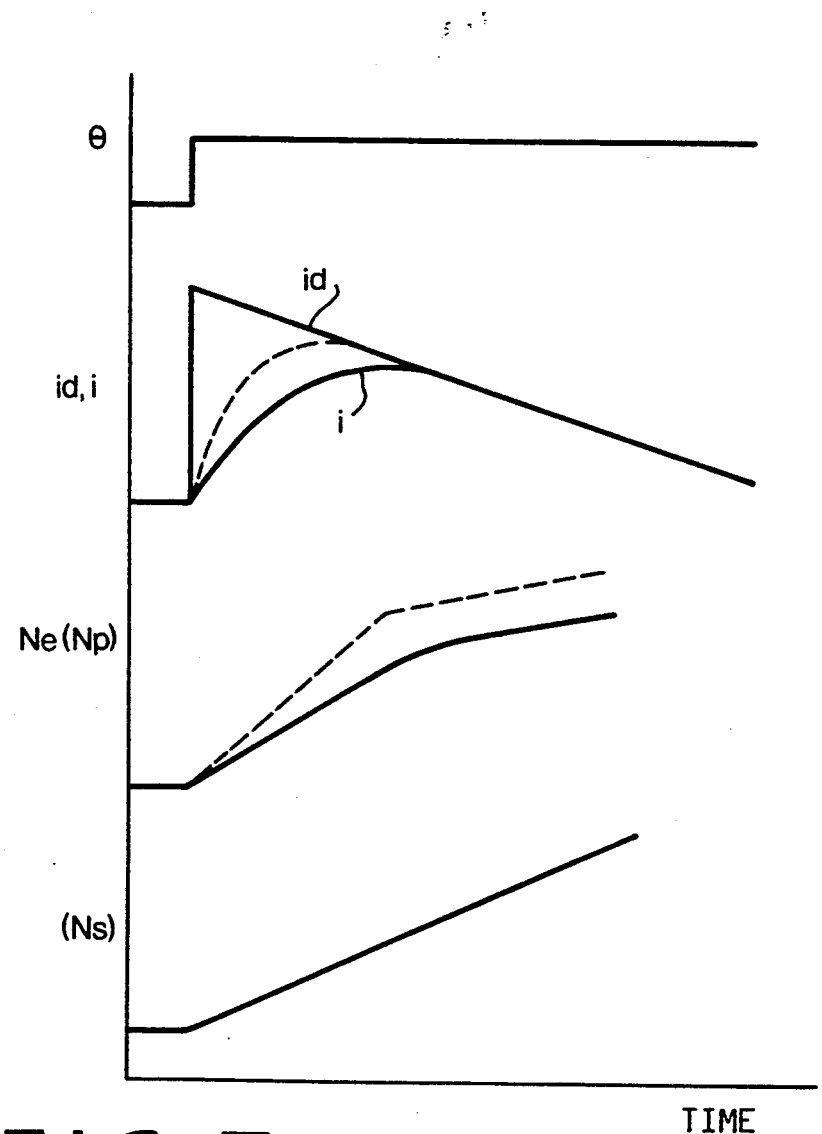
FIG. 7 is a graph showing characteristics of acceleration of the second embodiment.

Referring to FIGS. 6 and 7 showing the second embodiment of the present invention, a system of the second embodiment is provided with a correcting coefficient look-up table for improving the feeling of acceleration is high speed driving.

The correcting coefficient K1 is set to a smaller value in high speed driving than the low speed driving since the driver does not require rapid acceleration. If the throttle opening degree changing speed (rate) $\dot{\theta}$ becomes large and the vehicle speed becomes comparatively high, the correcting coefficient K1 becomes smaller.

FIG. 6 shows a look-up table for the correcting coefficient K1 for correcting the transmission ratio changing speed (rate) di/dt at acceleration at high speed driving. The coefficient K1 is a decreasing function of the throttle opening degree changing speed (rate) $\dot{\theta}$ and the vehicle speed.

Describing the operation at acceleration at high speed driving, when the vehicle speed is comparatively low at higher throttle opening degree changing speed (rate) $\theta$, where the drive pulley speed and the engine speed are low, the correcting coefficient K1 is determined comparatively to a large value as shown in FIG. 6. Thus, the transmission ratio changing speed (rate) di/dt becomes comparatively large and the actual transmission ratio i corresponds to the desired transmission ratio id as shown by a dotted line of FIG. 7.

When the vehicle speed increases and the throttle valve opening degree changing speed (rate) $\dot{\theta}$ is large, the correcting coefficient K1 is sufficiently set to a small value to reduce the transmission ratio changing speed (rate) di/dt. Thus, the actual transmission ratio i slowly converges toward the desired transmission ratio id to prevent a quick increase of the engine speed so that the feeling of acceleration is improved in the high speed driving.

Thus, the transmission ratio changing speed (rate) is corrected in accordance with the driver's requirement for acceleration.

Figure 8:
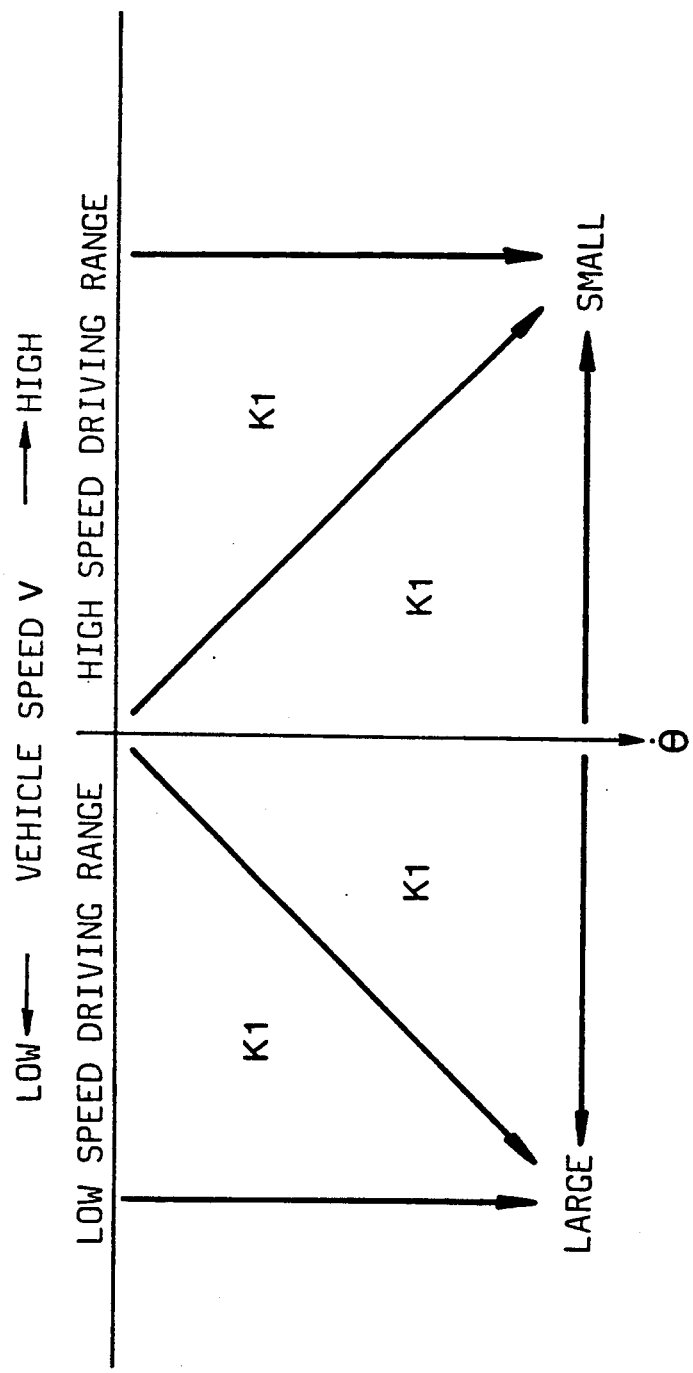
FIG. 8 shows a look-up table of a correcting coefficient in all vehicle speed ranges.

FIG. 8 shows a look-up table for the correcting coefficient K1 in all speed driving ranges showing the characteristic of FIG. 3 and FIG. 6 together. In low speed driving, the transmission ratio changing speed is corrected in accordance with the increasing function of the throttle opening degree changing speed (rate) and the decreasing function of the vehicle speed. In high speed driving, the transmission ratio changing speed (rate) is corrected with the decreasing functions of the throttle opening degree changing speed (rate) and the vehicle speed. Thus, the acceleration characteristic is improved in a wide vehicle speed range.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A control system for a continuously variable transmission for transmitting power of an engine mounted on a motor vehicle, the engine having a throttle valve, the transmission comprising a drive pulley having a hydraulically shiftable drive disc and a hydraulic cylinder for operating the drive disc, a driven pulley having a hydraulically shiftable driven disc and a hydraulic cylinder for operating the driven disc, a belt engaged with both of said pulleys, the control system comprising a first hydraulic circuit having a pump for supplying oil to both of the hydraulic cylinders, a transmission ratio control valve for controlling the oil supplied to the cylinder of the drive pulley to change a transmission ratio of the transmission to a desired transmission ratio, the system comprising:

transmission ratio control means for operating the transmission ratio control valve;

a drive pulley speed sensor for producing a drive pulley speed signal;

a driven pulley speed sensor for producing a driven pulley speed signal;

a throttle position sensor for sensing an opening degree of the throttle valve and for producing a throttle opening degree signal;

first calculator means responsive to the drive pulley speed signal and the driven pulley speed signal for producing an actual transmission ratio signal;

means responsive to the throttle opening degree signal and to the actual transmission ratio signal for producing a desired transmission ratio signal;

second calculator means responsive to the desired transmission ratio signal and to the actual transmission ratio signal for producing a transmission ratio changing speed signal;

third calculator means responsive to the throttle opening degree signal for producing a throttle opening degree changing speed signal;

coefficient setting means responsive to the driven pulley speed signal as a vehicle speed signal and to the throttle opening degree changing speed signal for producing a correcting coefficient, wherein the correcting coefficient represents an increasing function of the throttle opening degree changing speed signal and a decreasing function of the driven pulley speed signal as said vehicle speed signal in a low vehicle speed range lower than a predetermined vehicle speed;

said second calculator means comprising correcting means for correcting the transmission ratio changing speed signal with the correcting coefficient so as to provide a higher transmission ratio changing speed in a low vehicle speed range; and driving means responsive to the transmission ratio changing speed signal corrected by the correcting means for operating the tranmission ratio control means, for controlling the transmission ratio.

2. The system according to claim 1, wherein the correcting coefficient is a decreasing function of the throttle opening degree changing speed signal and a decreasing function of the driven pulley speed signal in a high vehicle speed range higher than said predetermined vehicle speed.

3. A control system for a continuously variable transmission for transmitting power of an engine mounted on a motor vehicle, the engine having a throttle valve, the transmission comprising a drive pulley having a hydraulically shiftable drive disc and a hydraulic cylinder for operating the drive disc, a driven pulley having a hydraulically shiftable driven disc and a hydraulic cylinder for operating the driven disc, a belt engaged with both of said pulleys, the control system comprising a first hydraulic circuit having a pump for supplying oil to both of the hydraulic cylinders, a transmission ratio control valve for controlling the oil supplied to the cylinder of the drive pulley to change a transmission ratio of the transmission to a desired transmission ratio, the system comprising:

transmission ratio control means for operating the transmission ratio control valve;

a drive pulley speed sensor for producing a drive pulley speed signal;

a driven pulley speed sensor for producing a driven pulley speed signal;

a throttle position sensor for sensing an opening degree of the throttle valve and for producing a throttle opening degree signal;

first calculator means responsive to the drive pulley speed signal and the driven pulley speed signal for producing an actual transmission ratio signal;

means responsive to the throttle opening degree signal and to the actual transmission ratio signal for producing a desired transmission ratio signal;

second calculator means responsive to the desired transmission ratio signal and to the actual transmission ratio signal for producing a transmission ratio changing speed signal;

third calculator means responsive to the throttle opening degree signal for producing a throttle opening degree changing speed signal;

coefficient setting means responsive to the driven pulley speed signal as a vehicle speed signal and to the throttle opening degree changing speed signal for producing a correcting coefficient, wherein the correcting coefficient represents a decreasing function of the throttle opening degree changing speed signal and a decreasing function of the driven pulley speed signal as said vehicle speed signal in a high vehicle speed range higher than a predetermined vehicle speed;

said second calculator means comprising correcting means for correcting the transmission ratio changing speed signal with the correcting coefficient so as to provide a higher transmission ratio changing speed in a low vehicle speed range; and driving means responsive to the transmission ratio changing speed signal corrected by the correcting means for operating the transmission ratio control means, for controlling the transmission ratio.

4. The system according to claim 3, wherein the correcting coefficient is an increasing function of the throttle opening degree changing sped signal and a decreasing function of the driven pulley speed signal in a low vehicle speed range lower than said predetermined vehicle speed.

* * * * *